(12) United States Patent
Galvagni et al.

(10) Patent No.: US 8,514,547 B2
(45) Date of Patent: Aug. 20, 2013

(54) VOLUMETRICALLY EFFICIENT WET ELECTROLYTIC CAPACITOR

(75) Inventors: John Galvagni, Hendersonville, NC (US); Tomas Karnik, Lanskroun (CZ); James Steven Bates, Saco, ME (US); Richard Baker, Kennebunk, ME (US); Dirk H. Dreissig, Myrtle Beach, SC (US); Andrew Paul Ritter, Surfside Beach, SC (US)

(73) Assignee: AVX Corporation, Fountain Inn, SC (US)

( * ) Notice: Subject to any disclaimer, the term of this patent is extended or adjusted under 35 U.S.C. 154(b) by 244 days.

(21) Appl. No.: 12/916,788

(22) Filed: Nov. 1, 2010

(65) Prior Publication Data

US 2012/0106029 A1      May 3, 2012

(51) Int. Cl.
*H01G 9/04*       (2006.01)
*H01G 9/145*     (2006.01)

(52) U.S. Cl.
USPC ........................................... 361/508; 361/516

(58) Field of Classification Search
USPC .................................. 361/503, 508, 516–517
See application file for complete search history.

(56) References Cited

U.S. PATENT DOCUMENTS

| | | |
|---|---|---|
| 3,476,557 A | 11/1969 | Fincham |
| 3,809,552 A | 5/1974 | Klein |
| 3,956,819 A | 5/1976 | Augeri |
| 4,002,473 A | 1/1977 | Klein |
| 4,025,827 A | 5/1977 | Pellerin et al. |
| 4,044,218 A | 8/1977 | Olson et al. |
| 4,065,636 A | 12/1977 | Herczog |
| 4,168,351 A | 9/1979 | Taylor |
| 4,296,458 A | 10/1981 | Smith et al. |
| 4,479,168 A | 10/1984 | Green, Jr. |
| 4,537,641 A | 8/1985 | Albrecht et al. |
| 4,538,212 A | 8/1985 | Montgomery |
| 4,634,631 A | 1/1987 | Gazit et al. |
| 4,761,714 A | 8/1988 | Levasseur et al. |
| 4,780,797 A | 10/1988 | Libby |
| 4,987,519 A | 1/1991 | Hutchins et al. |
| 4,992,910 A | 2/1991 | Evans |
| 5,075,940 A | 12/1991 | Kuriyama et al. |

(Continued)

FOREIGN PATENT DOCUMENTS

| | | |
|---|---|---|
| CN | 201319325 Y | 9/2009 |
| GB | 2468942 A | 9/2010 |
| JP | 3 004512 A | 1/1991 |
| JP | 2001110685 A | 4/2001 |

OTHER PUBLICATIONS

GB Search Report for GB1117852.2 dated Feb. 17, 2012, 4 pages.

(Continued)

*Primary Examiner* — Eric Thomas
(74) *Attorney, Agent, or Firm* — Dority & Manning, P.A.

(57) ABSTRACT

A wet electrolytic capacitor that contains a sintered anode positioned with an interior space of a metal casing is provided. The anode and metal casing are of a size such that the anode occupies a substantial portion of the volume of the interior space. More particularly, the anode typically occupies about 70 vol. % or more, in some embodiments about 75 vol. % or more, in some embodiments from about 80 vol. % to about 98 vol. %, and in some embodiments, from about 85 vol. % to 95 vol. % of the interior space. Among other things, the use of an anode that occupies such a large portion of the interior space enhances volumetric efficiency and other electrical properties of the resulting capacitor.

17 Claims, 6 Drawing Sheets

(56) References Cited

U.S. PATENT DOCUMENTS

| | | |
|---|---|---|
| 5,098,485 A | 3/1992 | Evans |
| 5,104,738 A | 4/1992 | Brow et al. |
| 5,136,474 A | 8/1992 | Sarangapani et al. |
| 5,236,627 A | 8/1993 | Hannecart et al. |
| 5,284,723 A | 2/1994 | Hannecart et al. |
| 5,369,547 A | 11/1994 | Evans |
| 5,400,211 A | 3/1995 | Evans |
| 5,435,874 A | 7/1995 | Takeuchi et al. |
| 5,456,878 A | 10/1995 | Tadokoro et al. |
| 5,457,862 A | 10/1995 | Sakata et al. |
| 5,469,325 A | 11/1995 | Evans |
| 5,473,503 A | 12/1995 | Sakata et al. |
| 5,543,249 A | 8/1996 | Takeuchi et al. |
| 5,559,667 A | 9/1996 | Evans |
| 5,571,640 A | 11/1996 | Takeuchi et al. |
| 5,648,302 A | 7/1997 | Brow et al. |
| 5,716,511 A | 2/1998 | Melody et al. |
| 5,726,118 A | 3/1998 | Ivey et al. |
| 5,729,428 A | 3/1998 | Sakata et al. |
| 5,737,181 A | 4/1998 | Evans |
| 5,754,394 A | 5/1998 | Evans et al. |
| 5,776,632 A | 7/1998 | Honegger |
| 5,786,980 A | 7/1998 | Evans |
| 5,808,857 A | 9/1998 | Stevens |
| 5,812,367 A | 9/1998 | Kudoh et al. |
| 5,849,031 A | 12/1998 | Martinez et al. |
| 5,858,911 A | 1/1999 | Wellen et al. |
| 5,894,403 A | 4/1999 | Shah et al. |
| 5,916,659 A | 6/1999 | Koerber et al. |
| 5,920,455 A | 7/1999 | Shah et al. |
| 5,922,215 A | 7/1999 | Pless et al. |
| 5,926,362 A | 7/1999 | Muffoletto et al. |
| 5,930,109 A | 7/1999 | Fishler |
| 5,968,210 A | 10/1999 | Strange et al. |
| 5,973,913 A | 10/1999 | McEwen et al. |
| 5,982,609 A | 11/1999 | Evans |
| 5,983,472 A | 11/1999 | Fayram et al. |
| 6,006,133 A | 12/1999 | Lessar et al. |
| 6,008,980 A | 12/1999 | Stevenson et al. |
| 6,009,348 A | 12/1999 | Rorvick et al. |
| 6,024,914 A | 2/2000 | Yoshida |
| 6,037,077 A | 3/2000 | Nowaczyk |
| 6,042,624 A | 3/2000 | Breyen et al. |
| 6,094,339 A | 7/2000 | Evans |
| 6,096,391 A | 8/2000 | Muffoletto et al. |
| 6,099,600 A | 8/2000 | Yan et al. |
| 6,110,622 A | 8/2000 | Frysz et al. |
| 6,117,195 A | 9/2000 | Honegger |
| 6,118,652 A | 9/2000 | Casby et al. |
| 6,157,531 A | 12/2000 | Breyen et al. |
| 6,162,345 A | 12/2000 | Kinard et al. |
| 6,184,160 B1 | 2/2001 | Yan et al. |
| 6,197,252 B1 | 3/2001 | Bishop et al. |
| 6,208,502 B1 | 3/2001 | Hudis et al. |
| 6,212,063 B1 | 4/2001 | Johnson et al. |
| 6,219,222 B1 | 4/2001 | Shah et al. |
| 6,224,985 B1 | 5/2001 | Shah et al. |
| 6,231,993 B1 | 5/2001 | Stephenson et al. |
| 6,238,810 B1 | 5/2001 | Strange et al. |
| 6,246,569 B1 | 6/2001 | Strange et al. |
| 6,249,423 B1 | 6/2001 | O'Phelan et al. |
| 6,261,434 B1 | 7/2001 | Melody et al. |
| 6,267,861 B1 | 7/2001 | Kinard et al. |
| 6,322,912 B1 | 11/2001 | Fife |
| 6,332,900 B1 | 12/2001 | Muffoletto et al. |
| 6,334,879 B1 | 1/2002 | Muffoletto et al. |
| 6,346,185 B1 | 2/2002 | Kinard et al. |
| 6,377,442 B1 | 4/2002 | Strange et al. |
| 6,388,866 B1 | 5/2002 | Rorvick et al. |
| 6,391,275 B1 | 5/2002 | Fife |
| 6,402,793 B1 | 6/2002 | Miltich et al. |
| 6,416,730 B1 | 7/2002 | Fife |
| 6,421,226 B1 | 7/2002 | O'Phelan et al. |
| 6,426,864 B1 | 7/2002 | O'Phelan et al. |
| 6,455,108 B1 | 9/2002 | Muffoletto et al. |
| 6,459,566 B1 | 10/2002 | Casby et al. |
| 6,461,759 B1 | 10/2002 | Miller et al. |
| 6,461,771 B1 | 10/2002 | Frysz et al. |
| 6,468,605 B2 | 10/2002 | Shah et al. |
| 6,477,037 B1 | 11/2002 | Nielsen et al. |
| 6,493,212 B1 | 12/2002 | Clarke et al. |
| 6,527,937 B2 | 3/2003 | Fife |
| 6,535,374 B2 | 3/2003 | O'Phelan et al. |
| 6,556,863 B1 | 4/2003 | O'Phelan et al. |
| 6,560,089 B2 | 5/2003 | Miltich et al. |
| 6,576,099 B2 | 6/2003 | Kimmel et al. |
| 6,576,524 B1 | 6/2003 | Evans et al. |
| 6,592,740 B2 | 7/2003 | Fife |
| 6,594,139 B2 | 7/2003 | Shah et al. |
| 6,594,140 B1 | 7/2003 | Evans et al. |
| 6,599,580 B2 | 7/2003 | Muffoletto et al. |
| 6,603,654 B2 | 8/2003 | Rorvick et al. |
| 6,613,474 B2 | 9/2003 | Frustaci et al. |
| 6,639,787 B2 | 10/2003 | Kimmel et al. |
| 6,648,928 B2 | 11/2003 | Nielsen et al. |
| 6,652,729 B2 | 11/2003 | Melody et al. |
| 6,659,283 B1 | 12/2003 | Muffoletto et al. |
| 6,687,117 B2 | 2/2004 | Liu et al. |
| 6,687,118 B1 | 2/2004 | O'Phelan et al. |
| 6,707,660 B1 | 3/2004 | Evans et al. |
| 6,721,169 B2 | 4/2004 | Melody et al. |
| 6,721,170 B1 | 4/2004 | Evans et al. |
| 6,727,022 B2 | 4/2004 | Gan et al. |
| 6,737,490 B2 | 5/2004 | Sumi et al. |
| 6,740,420 B2 | 5/2004 | Muffoletto et al. |
| 6,743,547 B2 | 6/2004 | Gan et al. |
| 6,788,523 B1 | 9/2004 | Hossick-Schott et al. |
| 6,790,561 B2 | 9/2004 | Gan et al. |
| 6,795,729 B1 | 9/2004 | Breyen et al. |
| 6,801,424 B1 | 10/2004 | Nielsen et al. |
| 6,802,951 B2 | 10/2004 | Hossick-Schott |
| 6,802,954 B1 | 10/2004 | Hemphill et al. |
| 6,805,777 B1 | 10/2004 | D'Astolfo, Jr. |
| 6,807,048 B1 | 10/2004 | Nielsen et al. |
| 6,815,306 B1 | 11/2004 | Strange et al. |
| 6,819,544 B1 | 11/2004 | Nielsen et al. |
| 6,827,879 B2 | 12/2004 | Shinozaki et al. |
| 6,828,059 B2 | 12/2004 | Miller et al. |
| 6,842,328 B2 | 1/2005 | Schott et al. |
| 6,850,405 B1 | 2/2005 | Mieham et al. |
| 6,858,126 B1 | 2/2005 | Hemphill et al. |
| 6,859,354 B2 | 2/2005 | Viste et al. |
| 6,888,717 B2 | 5/2005 | Kinard et al. |
| 6,893,777 B2 | 5/2005 | Probst |
| 6,922,330 B2 | 7/2005 | Nielsen et al. |
| 6,939,774 B2 | 9/2005 | Viste et al. |
| 6,946,220 B2 | 9/2005 | Probst et al. |
| 6,951,576 B1 | 10/2005 | Takeuchi |
| 6,952,339 B1 | 10/2005 | Knowles |
| 6,963,482 B2 | 11/2005 | Breyen et al. |
| 6,965,509 B2 | 11/2005 | Reynolds et al. |
| 6,965,510 B1 | 11/2005 | Liu et al. |
| 6,967,828 B2 | 11/2005 | Miltich et al. |
| 6,985,352 B2 | 1/2006 | Norton |
| 6,987,663 B2 | 1/2006 | Merker et al. |
| 6,995,971 B2 | 2/2006 | Norton et al. |
| 7,000,297 B2 | 2/2006 | Frustaci et al. |
| 7,002,790 B2 | 2/2006 | Hossick-Schott et al. |
| 7,012,799 B2 | 3/2006 | Muffoletto et al. |
| 7,038,901 B2 | 5/2006 | Muffoletto et al. |
| 7,043,300 B2 | 5/2006 | O'Phelan et al. |
| 7,072,171 B1 | 7/2006 | Muffoletto et al. |
| 7,079,377 B2 | 7/2006 | Schott et al. |
| 7,081,141 B2 | 7/2006 | Hossick-Schott et al. |
| 7,085,126 B2 | 8/2006 | Muffoletto et al. |
| 7,090,762 B2 | 8/2006 | Tripp et al. |
| 7,092,242 B1 | 8/2006 | Gloss et al. |
| 7,099,143 B1 | 8/2006 | Fife et al. |
| 7,110,240 B2 | 9/2006 | Breyen et al. |
| 7,116,547 B2 | 10/2006 | Seitz et al. |
| 7,150,767 B1 | 12/2006 | Schneider et al. |
| 7,168,142 B2 | 1/2007 | Nowaczyk |
| 7,177,140 B2 | 2/2007 | Clarke et al. |
| 7,196,899 B1 | 3/2007 | Feger et al. |

| | | |
|---|---|---|
| 7,206,186 B1 | 4/2007 | Knight et al. |
| 7,220,397 B2 | 5/2007 | Kimmel et al. |
| 7,224,576 B2 | 5/2007 | Hossick-Schott |
| 7,242,572 B2 | 7/2007 | Norton et al. |
| 7,244,279 B2 | 7/2007 | Seitz et al. |
| 7,248,462 B2 | 7/2007 | Melody et al. |
| 7,256,982 B2 | 8/2007 | Lessner et al. |
| 7,271,994 B2 | 9/2007 | Stemen et al. |
| 7,274,551 B1 | 9/2007 | Parler, Jr. et al. |
| 7,286,336 B2 | 10/2007 | Liu et al. |
| 7,301,754 B1 | 11/2007 | Knowles |
| 7,314,685 B2 | 1/2008 | Brown et al. |
| 7,324,329 B2 | 1/2008 | Dweik et al. |
| 7,330,347 B2 | 2/2008 | Clasen et al. |
| 7,341,705 B2 | 3/2008 | Schnitter |
| 7,342,774 B2 | 3/2008 | Hossick-Schott et al. |
| 7,375,949 B2 | 5/2008 | Barr et al. |
| 7,381,396 B2 | 6/2008 | Thomas et al. |
| 7,385,802 B1 | 6/2008 | Ribble et al. |
| 7,402,183 B1 | 7/2008 | Jiang |
| 7,419,926 B2 | 9/2008 | Schnitter et al. |
| 7,420,797 B2 | 9/2008 | Schmidt |
| 7,445,646 B1 | 11/2008 | Strange et al. |
| 7,456,073 B2 | 11/2008 | Fife et al. |
| 7,474,521 B2 | 1/2009 | Hossick-Schott |
| 7,480,130 B2 | 1/2009 | Fife et al. |
| 7,483,260 B2 | 1/2009 | Ziarniak et al. |
| 7,499,260 B2 | 3/2009 | Schott et al. |
| 7,511,943 B2 | 3/2009 | Fife et al. |
| 7,515,396 B2 | 4/2009 | Biler |
| 7,531,010 B1 | 5/2009 | Feger et al. |
| 7,544,218 B2 | 6/2009 | Norton et al. |
| 7,555,339 B2 | 6/2009 | Nielsen et al. |
| 7,558,051 B2 | 7/2009 | O'Phelan et al. |
| 7,589,956 B2 | 9/2009 | Norton et al. |
| 7,645,538 B1 | 1/2010 | Hallifax et al. |
| 7,667,954 B2 | 2/2010 | Lessner et al. |
| 7,678,259 B2 | 3/2010 | Melody et al. |
| 7,684,171 B2 | 3/2010 | Rorvick et al. |
| 7,687,102 B2 | 3/2010 | Hossick-Schott et al. |
| 7,710,713 B2 | 5/2010 | Restorff et al. |
| 7,715,174 B1 | 5/2010 | Beauvais et al. |
| 7,722,683 B2 | 5/2010 | Doffing et al. |
| 7,727,372 B2 | 6/2010 | Liu et al. |
| 7,731,893 B2 | 6/2010 | Freeman et al. |
| 7,813,107 B1 | 10/2010 | Druding et al. |
| 7,837,743 B2 | 11/2010 | Gaffney et al. |
| 7,867,290 B2 | 1/2011 | Nielsen et al. |
| 7,879,217 B2 | 2/2011 | Goad et al. |
| 2004/0240152 A1 | 12/2004 | Schott et al. |
| 2004/0243183 A1 | 12/2004 | Norton et al. |
| 2005/0002147 A1 | 1/2005 | Nielsen et al. |
| 2005/0089711 A1 | 4/2005 | Hossick-Schott |
| 2005/0131509 A1 | 6/2005 | Atanassoska et al. |
| 2006/0028786 A1 | 2/2006 | Norton et al. |
| 2006/0091020 A1 | 5/2006 | Hossick-Schott et al. |
| 2006/0191796 A1 | 8/2006 | Muffoletto et al. |
| 2007/0025063 A1 | 2/2007 | Viste et al. |
| 2007/0201186 A1 | 8/2007 | Norton et al. |
| 2007/0221507 A1 | 9/2007 | Liu et al. |
| 2008/0007894 A1 | 1/2008 | Seitz et al. |
| 2008/0013257 A1 | 1/2008 | Seitz et al. |
| 2008/0085451 A1 | 4/2008 | Freitag et al. |
| 2008/0229565 A1 | 9/2008 | Schott et al. |
| 2009/0035652 A1 | 2/2009 | Freitag et al. |
| 2009/0081552 A1 | 3/2009 | Shah et al. |
| 2009/0117457 A1 | 5/2009 | Davis et al. |
| 2009/0125089 A1 | 5/2009 | Bischoff et al. |
| 2009/0193637 A1 | 8/2009 | McCracken et al. |
| 2009/0273885 A1 | 11/2009 | Jiang et al. |
| 2009/0279232 A1 | 11/2009 | Druding et al. |
| 2010/0065629 A1 | 3/2010 | Wentker et al. |
| 2010/0067174 A1 | 3/2010 | Ning |
| 2010/0142124 A1 | 6/2010 | Dreissig et al. |
| 2010/0155645 A1 | 6/2010 | Liu et al. |
| 2010/0238608 A1 | 9/2010 | Dreissig et al. |
| 2010/0268292 A1 | 10/2010 | Eidelman et al. |
| 2010/0284124 A1 | 11/2010 | Iyer |
| 2010/0302709 A1 | 12/2010 | Dreissig et al. |
| 2010/0318140 A1 | 12/2010 | Hintz et al. |

OTHER PUBLICATIONS

Abstract of Article—Carlberg, et al., "Poly(3,4-ethylenedioxythiophene) as Electrode Material in Electrochemical Capacitors," *Journal of the Electrochemical Society*, vol. 144, Issue 4, 1997, pp. L61-L64.

Article—Groenendaal et al., "Poly(3,4-ethylenedioxythiophene) and Its Derivatives: Past, Present and Future," Advanced Materials, Dec. 27, 1999, 14 pages.

Article—Naoi et al., "Advanced Polymers as Active Materials and Electrolytes for Electrochemical Capacitors and Hybrid Capacity Systems," *The Electrochemical Society Interface*, Spring 2008, 5 pages.

Product Information from H.C. Starck on BAYTRON® P—Conductive Polymer Products, Baytronics, 2006, 3 pages.

Product Information from SinoDevices for Tantalum Products, 2009, 4 pages, www.sinodevices.com.

Paper—Wet Electrolyte Tantalum Capacitors from Vishay, Sep. 1, 2003, 4 pages, www.vishay.com.

Paper—Wet Tantalum Capacitors Sintered Anode TANTALEX® Capacitors for Operation to +125°C, Elastomer-Sealed from Vishay, Jun. 19, 2007, 5 pages, www.vishay.com.

Paper—Guide to prepare In-Situ-PEDT-Layers from H.C. Starck, 2008, 2 pages.

Paper—Aldissi et al., "Conducting Polymers in Ultracapacitor Applications," Presented at Conference Proceedings at ANTEC '98, Atlanta, Georgia, Apr. 26-Apr. 30, 1998, 6 pages.

Paper—Čespiva et al., "Tantalum Hybrid® Capacitors—The Capacitors with the Highest Available Power Density in Medium Voltage Range," Dec. 2009, 15 pages.

Paper—Edson et al., "Electrical Properties of a Novel High CV Wet Tantalum Capacitor System," CARTS USA Mar. 30-Apr. 2, 2009, Jacksonville, Florida, 11 pages.

Paper—Ennis et al., "Recent Advances in High Voltage, High Energy Capacitor Technology," General Atomics Energy Products Engineering Bulletin, 16$^{th}$ IEEE International Pulsed Power Conference, Jun. 2007, Albuquerque, New Mexico.

Paper—Evans, "High Energy Density Electrolytic-Electrochemical Hybrid Capacitor," Presented to the 14$^{th}$ Capacitor and Resistor Technology Symposium, Mar. 22, 1994, and published in CARTS '94 Proceedings, 6 pages.

Paper—Evans et al., "Performance of Mil-Type Hybrid Tantalum Capacitors," Presented at the 15$^{th}$ Capacitor and Resistor Technology Symposium (CARTS), Mar. 13-16, 1996, 9 pages.

Paper —reeman et al., "Reliability and Critical Applications of Tantalum Capacitors," 2007 Electronics Components, Assemblies, and Materials Association, Arlington, VA, USA, Proceedings CARTS Europe 2007 Symposium, Oct.-Nov. 2007, Barcelona, Spain, pp. 193-204.

Paper—Merker et al., "New Conducting Polymer Dispersions for Solid Electrolytic Capacitors," CARTS Europe 2005, Oct. 17-20, 2005, Prague, CZ Republic, 6 pages.

Paper —Merker et al., "Tuning Conducting Polymer Dispersions for High-CV Tantalum Capacitors," CARTS Europe Oct. 29-.Nov. 1, 2007, Barcelona, Spain, 6 pages.

Paper—Rudge et al., "Conducting Polymers as Active Materials in Electrochemical Capacitors," Dec. 1993, 38 pages.

Paper—Rudge et al., "Scheme for the Use of Conducting Polymers as Active Materials in Electrochemical Supercapacitors," 1993, 12 pages.

Paper—Sautter, Baytron® and Ampertron®: Conductive and Semiconductive Materials for OLED and Organic Electronics Applications, Dec. 17, 2007, 33 pages.

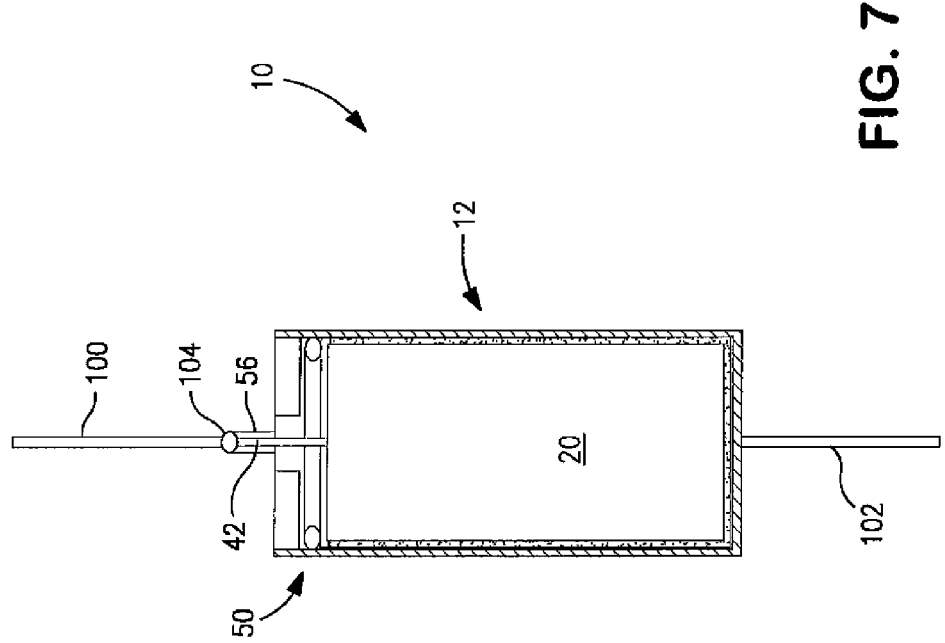

VOLUMETRICALLY EFFICIENT WET ELECTROLYTIC CAPACITOR

BACKGROUND OF THE INVENTION

Electrolytic capacitors are increasingly being used in the design of circuits due to their volumetric efficiency, reliability, and process compatibility. Typically, electrolytic capacitors have a larger capacitance per unit volume than certain other types of capacitors, making electrolytic capacitors valuable in relatively high-current and low-frequency electrical circuits. One type of capacitor that has been developed is a wet electrolytic capacitor that includes an anode, a cathode, and a liquid or "wet" working electrolyte. Wet electrolytic capacitors tend to offer a good combination of high capacitance with low leakage current. In certain situations, wet electrolytic capacitors may exhibit advantages over solid electrolytic capacitors. For example, wet electrolytic capacitors may, in certain situations, operate at a higher working voltage than solid electrolytic capacitors. Additionally, by way of example, wet electrolytic capacitors may be much larger in size than solid electrolytic capacitors, leading to larger capacitances for such large wet electrolytic capacitors.

In conventional wet electrolytic capacitors, the anode may be a metal foil (e.g., aluminum foil). Because the electrostatic capacitance of the capacitor is proportional to its electrode area, the surface of the metallic foil may be, prior to the formation of the dielectric film, roughened or subjected to a chemical conversion to increase its effective area. This step of roughening the surface of the metallic foil is called etching. Etching is normally carried out either by the method (chemical etching) of conducting immersion into a solution of hydrochloric acid or by the method (electrochemical etching) of carrying out electrolysis in an aqueous solution of hydrochloric acid. The capacitance of the electrolytic capacitor is determined by the extent of roughing (the surface area) of the anode foil and the thickness and the dielectric constant of the oxide film. Due to the limited surface area that may be provided by etching metallic foils, attempts have also been made to employ porous sintered bodies, also called "slugs", in wet electrolytic capacitors. A tantalum slug, for instance, may be formed by mixing powdered tantalum particles with a suitable binder/lubricant to ensure that the particles will adhere to each other when pressed to form the anode. The powdered tantalum is compressed under high pressure around a tantalum wire and is sintered at high temperature under vacuum to form a sponge-like structure, which is highly porous and provides a large internal surface area.

Despite the benefits achieved, it nevertheless remains difficult to achieve a capacitor that has a high energy density (energy per volume) and also a high volumetric efficiency (capacitance*voltage per volume). One method for increasing the energy density and capacitance of the capacitor, for instance, involves increasing the size of the anode. However, this can result in reduced volumetric efficiency due to the fact that a large volume is often needed to accommodate the separator, liquid seals, etc. In any event, it is often difficult to form anode slugs of a large size due to their tendency to bend and deform in shape upon sintering.

As such, a need exists for a volumetrically efficient wet electrolytic capacitor that is still capable of achieving a high energy density.

SUMMARY OF THE INVENTION

In accordance with one embodiment of the present invention, a wet electrolytic capacitor is disclosed that comprises a metal casing that contains a first edge portion and an opposing second edge portion extending in a longitudinal direction from an end portion to define an interior space. An electrochemically active cathode material is disposed on at least a portion of an interior surface of the metal casing. The capacitor further comprises an anode formed from an anodically oxidized, sintered porous body. The anode contains an upper end portion and a lower end portion, wherein a first edge portion and an opposing second edge portion extend in the longitudinal direction between the upper end portion and the lower end portion to define a length of the anode. The anode further has a width defined between the first edge portion and the second edge portion of the anode. The ratio of the width of the anode to the width of the interior space is from about 0.80 to 1.00. The anode is positioned within and occupies about 70 vol. % or more of the interior space defined by the metal casing. The capacitor also comprises a liquid electrolyte that is in electrical contact with the anode and the electrochemically active material.

In accordance with another embodiment of the present invention, a method for forming a wet electrolytic capacitor is disclosed. The method comprises compacting a powder that includes tantalum, niobium, or an electrically conductive oxide thereof to form a porous body, wherein an anode lead extends from the porous body. The porous body is sintered within a heat treatment device without physically contacting a surface of the porous body with an external surface. The sintered, porous body is anodically oxidized to form an anode having a length of from about 1 to about 60 millimeters and a width of from about 1 to about 40 millimeters. The anode is inserted into an interior space of a metal casing, wherein at least a portion of an interior surface of the metal casing is coated with an electrochemically active material. The anode and the electrochemically active material are contacted with a liquid electrolyte.

Other features and aspects of the present invention are described in more detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 7 is a cross-sectional view of one embodiment of a wet electrolytic capacitor of the present invention;

DETAILED DESCRIPTION OF REPRESENTATIVE EMBODIMENTS

Figure 3:
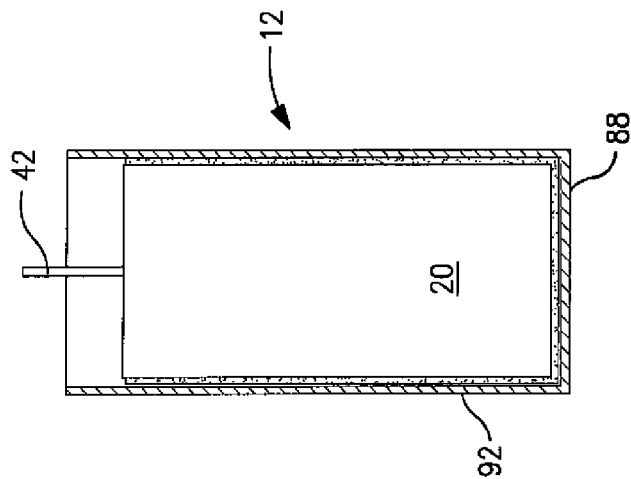
FIG. 3 shows the anode of FIG. 1 positioned within the casing of FIG. 2.

It is to be understood by one of ordinary skill in the art that the present discussion is a description of exemplary embodiments only, and is not intended as limiting the broader aspects of the present invention.

Generally speaking, the present invention is directed to a wet electrolytic capacitor that contains an anode positioned with an interior space of a metal casing. The anode and metal casing are of a size such that the anode occupies a substantial portion of the volume of the interior space. More particularly, the anode occupies about 70 vol. % or more, in some embodiments about 75 vol. % or more, in some embodiments from about 80 vol. % to about 98 vol. %, and in some embodiments, from about 85 vol. % to 97 vol. % of the interior space. Among other things, the use of an anode that occupies such a large portion of the interior space enhances the volumetric efficiency (capacitance*voltage per volume) of the resulting capacitor. The volumetric efficiency may, for example, range from about 10,000 $\mu F*V/cm^3$ to about 150,000 $\mu F/cm^3$, in some embodiments from about 15,000 $\mu F*V/cm^3$ to about 100,000 $\mu F*V/cm^3$, and in some embodiments, from about 20,000 $p_F*V/cm^3$ to about 95,000 $\mu F*V/cm^3$. Volumetric efficiency is determined by multiplying the rated voltage of a part by its capacitance, and then dividing by the product by the volume of the part. For example, a rating may be 50 volts for a part having a capacitance of 1800 $\mu F$, which results in a product of 90,000 $\mu F*V$. If the part occupies a volume of about 2 $cm^3$, this results in a volumetric efficiency of about 45,000 $\mu F*V/cm^3$.

The ability to employ an anode that has a size large enough to occupy a substantial portion of the interior of a metal casing is facilitated by optimizing the dimensional stability of the anode. More specifically, the present inventors have discovered that selective control over the materials and method from which the anode is made can allow it to remain dimensionally stable even after sintering. For example, the anode contains a porous body formed from a valve metal powder. The specific charge of the powder may vary, such as from about 2,000 $\mu F*V/g$ to about 80,000 $\mu F*V/g$, in some embodiments from about 5,000 $\mu F*V/g$ to about 40,000 $\mu F*V/g$ or more, and in some embodiments, from about 10,000 to about 20,000 $\mu F*V/g$. The valve metal powder contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

The particles of the powder may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2/g$, in some embodiments from about 0.5 to about 5.0 $m^2/g$, and in some embodiments, from about 1.0 to about 2.0 $m^2/g$. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 $g/cm^3$, in some embodiments from about 0.2 to about 4.0 $g/cm^3$, and in some embodiments, from about 0.5 to about 3.0 $g/cm^3$.

Other components may be added to the powder to facilitate the construction of the anode body. For example, a binder and/or lubricant may be employed to ensure that the particles adequately adhere to each other when pressed to form the anode body. Suitable binders may include camphor, stearic and other soapy fatty acids, Carbowax (Union Carbide), Glyptal (General Electric), polyvinyl alcohols, naphthalene, vegetable wax, and microwaxes (purified paraffins). The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. After compaction, the resulting anode body may then be diced into any desired shape, such as square, rectangle, circle, oval, triangle, hexagon, octagon, heptagon, pentagon, etc. The anode body may also have a "fluted" shape in that it contains one or more furrows, grooves, depressions, or indentations to increase the surface to volume ratio to minimize ESR and extend the frequency response of the capacitance. The anode body may then be subjected to a heating step in which most, if not all, of any binder/lubricant are removed. For example, the anode body is typically heated by an oven that operates at a temperature of from about 150° C. to about 500° C. Alternatively, the binder/lubricant may also be removed by contacting the pellet with an aqueous solution, such as described in U.S. Pat. No. 6,197,252 to Bishop, et al.

Once formed, the anode body is then sintered. The temperature, atmosphere, and time of the sintering may depend on a variety of factors, such as the type of anode, the size of the anode, etc. Typically, sintering occurs at a temperature of from about from about 800° C. to about 1900° C., in some embodiments from about 1000° C. to about 1500° C., and in some embodiments, from about 1100° C. to about 1400° C., for a time of from about 5 minutes to about 100 minutes, and in some embodiments, from about 30 minutes to about 60 minutes. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

Due to the specific charge of the powder used to form the anode body, sintering generally results in a substantial degree of shrinkage. As the size of the anode body increases, this shrinkage can cause a fairly significant degree of bending in the anode structure. Without intending to be limited by theory, it is believed that bending is increased when the anode body is in physical contact with external hard surface(s) (e.g., surface of a sinter tray). More specifically, such hard surfaces can limit shrinkage of the anode body at those locations where physical contact exists (sometimes referred to as "pinning") and thereby result in less shrinkage at the area of physical contact than other locations of the anode body. This shrinkage differential can, in turn, cause the anode body to bend and form a curved shape (e.g., crescent shape). To minimize such bending, the present inventors have discovered that sintering may be performed in such a manner that the surfaces of the anode body are not in physical contact with an external surface (e.g., surface of a sintering tray).

Figure 9:
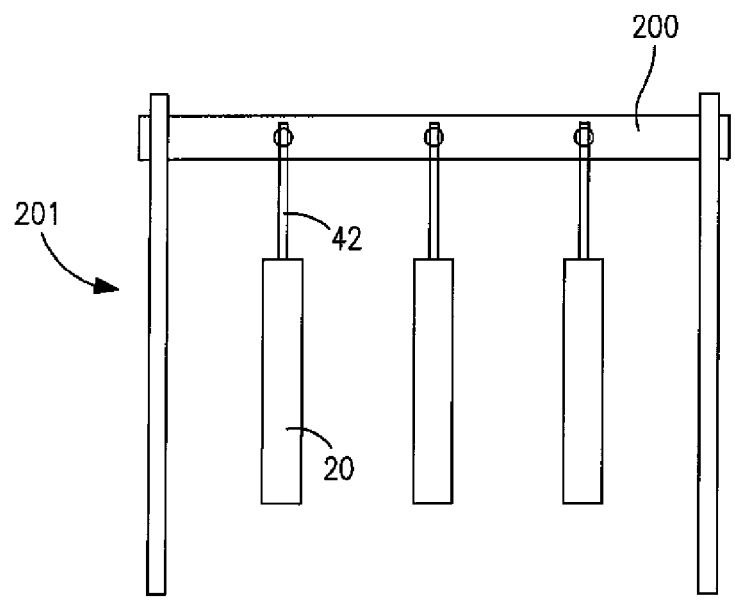
FIGS. 9-10 schematically illustrate one embodiment of a sintering method that may be employed in the present invention.
Figure 10:
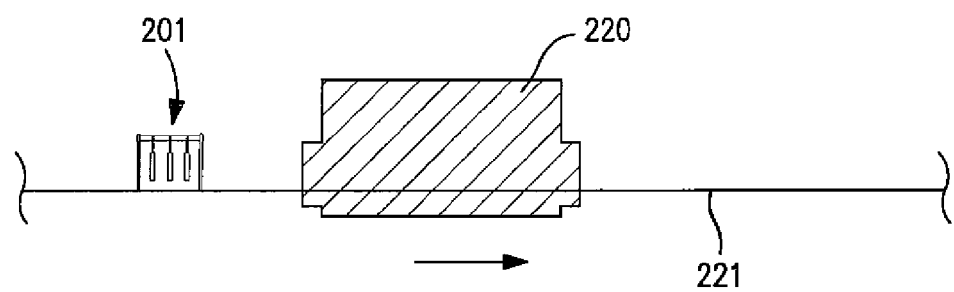

Referring to FIGS. 9-10, for example, one embodiment of such a sintering technique is shown in which one or more anodes 20 are connected to a stringer 200 via an anode lead 42. Any known method may be employed to attach the anode lead 42 to the stringer 200, such as welding, swaging, etc. In this manner, the anodes 20 are able to "hang" from the stringer 200 without physically contacting an external surface. The resulting anode assembly 201 may thus be positioned on a surface 221 that passes through a heat treatment device or furnace 220 (FIG. 10). As the anodes 20 are heated in the furnace 220, they are allowed to shrink freely without physical constraint. It should also be understood that various other configurations may be employed for sintering an anode without such constraint. In another embodiment, for instance, a hanging anode may be vertically displaced into a furnace and then lifted out of the device upon completion of the sintering process.

Figure 8:
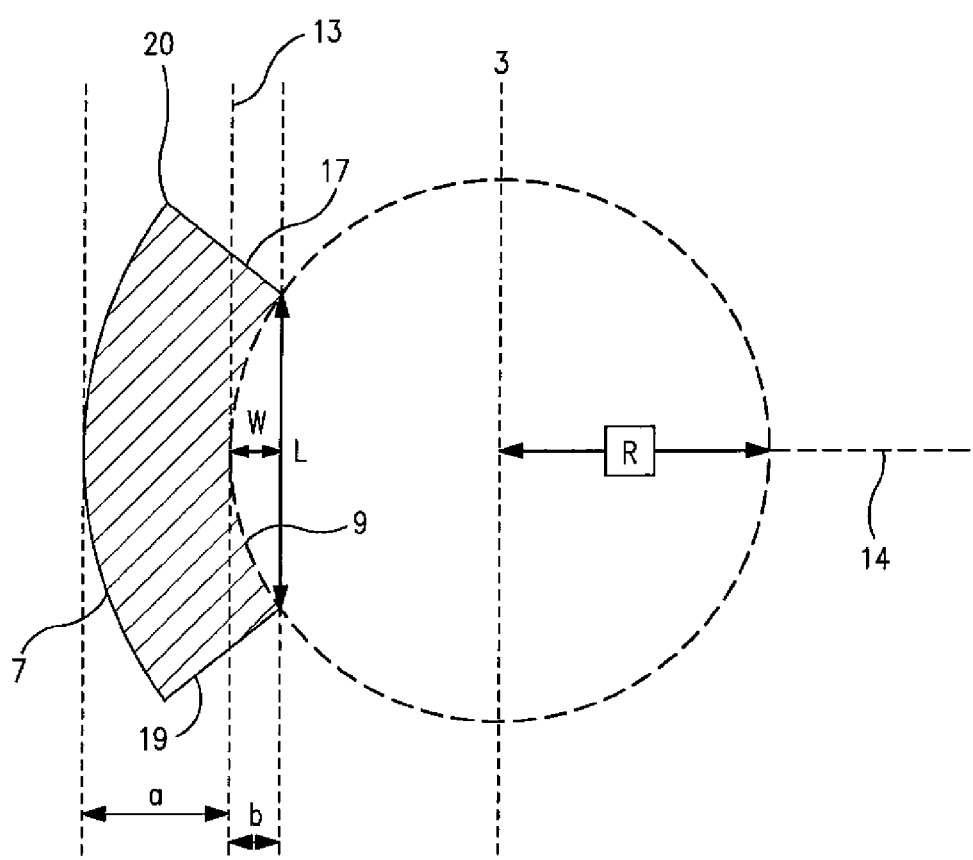
FIG. 8 is a cross-sectional view of a sintered anode body that may be employed in one embodiment of the present invention.

Despite its relatively large size, the resulting anode may thus remain dimensionally stable in that it possesses only a small degree of curvature, if any. The dimensional stability may be characterized by the orientation of the anode relative to a longitudinal medial plane that extends through an end of the anode. Referring to FIG. 8, for example, one embodiment of an anode 20 is shown that extends in the direction of a longitudinal axis 3. The anode 20 has an upper end portion 17 and lower end portion 19 between which extends a first edge portion 7 and an opposing second edge portion 9. A medial longitudinal plane 13 extends through the upper end portion 17 in a direction parallel to the longitudinal axis 3. Due to its dimensional stability, the anode 20 possesses only a small surface variance, if any, between the medial plane 13 and respective edge portions 7 and 9. That is, the difference "W" between the distance "a" (between the medial plane 13 and the edge portion 7) and the distance "b" (between the medial plane 13 and the edge portion 9), also known as "warp", is generally small along the length of the anode 20. For example, the difference W (or "warp") may be about 0.25 millimeters or less, in some embodiments about 0.20 millimeters or less, in some embodiments about 0.15 millimeters or less, and in some embodiments, from 0 to about 0.10 millimeters, along the length of the anode 20, such as at the center of the anode as shown in FIG. 8.

The radius of curvature, which is inversely proportional to the degree of curvature, may also be used to define the dimensionally stable anode 20. The radius of curvature may be specified in a direction that is representative of the general shape of the anode 20, such as in the direction of a medial transverse plane 14 that is perpendicular to the medial longitudinal plane 13. More particularly, the radius of curvature is represented by the designation "R" in FIG. 8, and may be calculated by the equation: Radius=$W/2+L^2/8W$, wherein W is the "warp" described above and L is the length. In certain embodiments, the radius of curvature in the direction of the medial transverse plane 14 may be about 25 centimeters or greater, in some embodiments about 50 centimeters or greater, and in some embodiments, about 100 centimeters or greater.

As indicated above, the anode is also coated with a dielectric. The dielectric may be formed by anodically oxidizing ("anodizing") the sintered anode so that a dielectric layer is formed over and/or within the anode. For example, a tantalum (Ta) anode may be anodized to tantalum pentoxide ($Ta_2O_5$). Typically, anodization is performed by initially applying a solution to the anode, such as by dipping anode into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

The anode of the present invention, such as described above, may generally be incorporated into a wet electrolytic capacitor using any of a variety of techniques known in the art. In this regard, FIGS. 1-6 illustrate one particular embodiment of a method for forming a capacitor 10 in accordance with the present invention.

Figure 1:
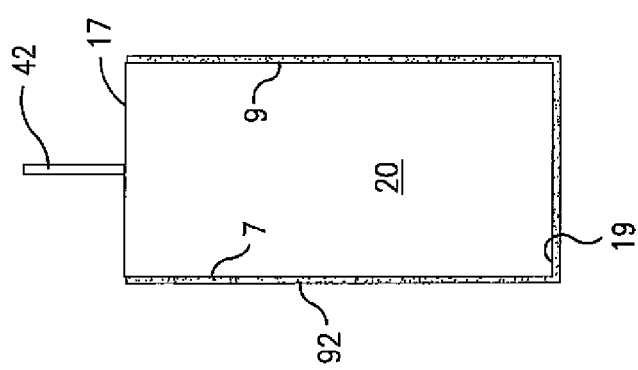
FIG. 1 is a cross-sectional view of an anode surrounded by a separator for use in one embodiment of the wet electrolytic capacitor of the present invention.
Figure 4:
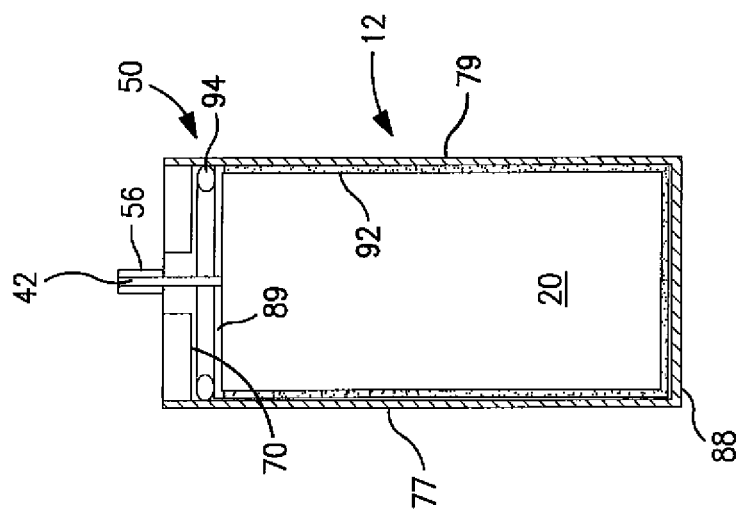
FIG. 4 is a cross-sectional view of the anode/casing assembly of FIG. 3 in combination with a liquid seal.

Referring to FIG. 1, for example, one embodiment of an anode 20 that may be employed in the present invention is shown. As indicated above, the anode 20 is formed from a sintered, porous body that is coated with a dielectric (not shown). The anode 20 may have any desired shape, such as cylindrical, D-shaped, rectangular, triangular, prismatic, etc.

An anode lead 42 (e.g., wire, sheet, etc.) is electrically connected to the anode 20. Electrical contact with the anode 20 may be accomplished by in a variety of ways, such as by coupling the lead 42 using resistance or laser welding. Alternatively, the lead 42 may be embedded into the anode body during its formation (e.g., prior to sintering). Regardless, the lead 42 is typically formed from any electrically conductive material, such as tantalum, niobium, nickel, aluminum, hafnium, titanium, etc., as well as oxides and/or nitrides of thereof.

If desired, the anode 20 may initially be impregnated with an electrolyte (not shown) before being positioned within the casing. The electrolyte may also be added to the capacitor at a later stage of production. The electrolyte is the material that provides the connecting path between the anode and cathode. Various suitable electrolytes are described in U.S. Pat. Nos. 5,369,547 and 6,594,140 to Evans, et al., which are incorporated herein their entirety by reference thereto for all purposes. Typically, the electrolyte is ionically conductive in that has an ionic conductivity of from about 0.5 to about 100 milliSiemens per centimeter ("mS/cm"), in some embodiments from about 1 to about 80 mS/cm, in some embodiments from about 5 mS/cm to about 60 mS/cm, and in some embodiments, from about 10 to about 40 mS/cm, determined at a temperature of 25° C. using any known electric conductivity meter (e.g., Oakton Con Series 11). Within the ranges noted above, it is believed that the ionic conductivity of the electrolyte allows the electric field to extend into the electrolyte to a length (Debye length) sufficient to result in significant charge separation. This extends the potential energy of the dielectric to the electrolyte so that the resulting capacitor is able to store even more potential energy than predicted by the thickness of the dielectric. In other words, the capacitor may be charged to a voltage that exceeds the formation voltage of the dielectric. The ratio of the voltage to which the capacitor can be charged to the formation voltage may, for instance, be from about 1.0 to 2.0, in some embodiments from about 1.1 to about 1.8, and in some embodiments, from about 1.2 to about 1.6. As an example, the voltage to which the capacitor is charged may be from about 200 to about 350 V, in some embodiments from about 220 to about 320 V, and in some embodiments, from about 250 to about 300V.

The electrolyte is generally in the form of a liquid, such as a solution (e.g., aqueous or non-aqueous), dispersion, gel, etc. For example, the electrolyte may be an aqueous solution of an acid (e.g., sulfuric acid, phosphoric acid, or nitric acid), base (e.g., potassium hydroxide), or salt (e.g., ammonium salt, such as a nitrate), as well any other suitable electrolyte known in the art, such as a salt dissolved in an organic solvent (e.g., ammonium salt dissolved in a glycol-based solution). Various other electrolytes are described in U.S. Pat. Nos. 5,369,547 and 6,594,140 to Evans, et al., which are incorporated herein their entirety by reference thereto for all purposes.

The desired ionic conductivity may be achieved by selecting ionic compound(s) (e.g., acids, bases, salts, and so forth) within certain concentration ranges. In one particular embodiment, salts of weak organic acids may be effective in achieving the desired conductivity of the electrolyte. The cation of the salt may include monatomic cations, such as alkali metals (e.g., $Li^+$, $Na^+$, $K^+$, $Rb^+$, or $Cs^+$), alkaline earth metals (e.g., $Be^{2+}$, $Mg^{2+}$, $Ca^{2+}$, $Sr^{2+}$ or $Ba^{2+}$), transition metals (e.g., $Ag^+$, $Fe^{2+}$, $Fe^{3+}$, etc.), as well as polyatomic cations, such as $NH_4^+$. The monovalent ammonium ($NH_4^+$), sodium ($K^+$), and lithium ($Li^+$) are particularly suitable cations for use in the present invention. The organic acid used to form the anion of the salt is "weak" in the sense that it typically has a first acid dissociation constant ($pK_{a1}$) of about 0 to about 11, in some embodiments about 1 to about 10, and in some embodiments, from about 2 to about 10, determined at 25° C. Any suitable weak organic acids may be used in the present invention, such as carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid (e.g., dextotartaric acid, mesotartaric acid, etc.), citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; blends thereof, and so forth. Polyprotic acids (e.g., diprotic, triprotic, etc.) are particularly desirable for use in forming the salt, such as adipic acid ($pK_{a1}$ of 4.43 and $pK_{a2}$ of 5.41), α-tartaric acid ($pK_{a1}$ of 2.98 and $pK_{a2}$ of 4.34), meso-tartaric acid ($pK_{a1}$ of 3.22 and $pK_{a2}$ of 4.82), oxalic acid ($pK_{a1}$ of 1.23 and $pK_{a2}$ of 4.19), lactic acid ($pK_{a1}$ of 3.13, $pK_{a2}$ of 4.76, and $pK_{a3}$ of 6.40), etc.

While the actual amounts may vary depending on the particular salt employed, its solubility in the solvent(s) used in the electrolyte, and the presence of other components, such weak organic acid salts are typically present in the electrolyte in an amount of from about 0.1 to about 25 wt. %, in some embodiments from about 0.2 to about 20 wt. %, in some embodiments from about 0.3 to about 15 wt. %, and in some embodiments, from about 0.5 to about 5 wt. %.

The electrolyte is typically aqueous in that it contains an aqueous solvent, such as water (e.g., deionized water). For example, water (e.g., deionized water) may constitute from about 20 wt. % to about 95 wt. %, in some embodiments from about 30 wt. % to about 90 wt. %, and in some embodiments, from about 40 wt. % to about 85 wt. % of the electrolyte. A secondary solvent may also be employed to form a solvent mixture. Suitable secondary solvents may include, for instance, glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); alcohols (e.g., methanol, ethanol, n-propanol, iso-propanol, and butanol); ketones (e.g., acetone, methyl ethyl ketone, and methyl isobutyl ketone); esters (e.g., ethyl acetate, butyl acetate, diethylene glycol ether acetate, methoxypropyl acetate, ethylene carbonate, propylene carbonate, etc.); amides (e.g., dimethylformamide, dimethylacetamide, dimethylcaprylic/capric fatty acid amide and N-alkylpyrrolidones); sulfoxides or sulfones (e.g., dimethyl sulfoxide (DMSO) and sulfolane); and so forth. Such solvent mixtures typically contain water in an amount from about 40 wt. % to about 80 wt. %, in some embodiments from about 50 wt. % to about 75 wt. %, and in some embodiments, from about 55 wt. % to about 70 wt. % and secondary solvent(s) in an amount from about 20 wt. % to about 60 wt. %, in some embodiments from about 25 wt. % to about 50 wt. %, and in some embodiments, from about 30 wt. % to about 45 wt. %. The secondary solvent(s) may, for example, constitute from about 5 wt. % to about 45 wt. %, in some embodiments from about 10 wt. % to about 40 wt. %, and in some embodiments, from about 15 wt. % to about 35 wt. % of the electrolyte.

If desired, the electrolyte may be relatively neutral and have a pH of from about 4.5 to about 7.0, in some embodiments from about 5.0 to about 6.5, and in some embodiments, from about 5.5 to about 6.0. One or more pH adjusters (e.g., acids, bases, etc.) may be employed to help achieve the desired pH. In one embodiment, an acid is employed to lower the pH to the desired range. Suitable acids include, for instance, inorganic acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. Although the total concentration of pH adjusters may vary, they are typically present in an amount of from about 0.01 wt. % to about 10 wt. %, in some embodiments from about 0.05 wt. % to about 5 wt. %, and in some embodiments, from about 0.1 wt. % to about 2 wt. % of the electrolyte.

The electrolyte may also contain other components that help improve the electrical performance of the capacitor. For instance, a depolarizer may be employed in the electrolyte to help inhibit the evolution of hydrogen gas at the cathode of the electrolytic capacitor, which could otherwise cause the capacitor to bulge and eventually fail. When employed, the depolarizer normally constitutes from about 1 to about 500 parts per million ("ppm"), in some embodiments from about 10 to about 200 ppm, and in some embodiments, from about 20 to about 150 ppm of the electrolyte. Suitable depolarizers may include nitroaromatic compounds, such as 2-nitrophenol, 3-nitrophenol, 4-nitrophenol, 2-nitrobenzonic acid, 3-nitrobenzonic acid, 4-nitrobenzonic acid, 2-nitroacetophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and so forth. Particularly suitable nitroaromatic depolarizers for use in the present invention are nitrobenzoic acids, anhydrides or salts thereof, substituted with one or more alkyl groups (e.g., methyl, ethyl, propyl, butyl, etc). Specific examples of such alkyl-substituted nitrobenzoic compounds include, for instance, 2-methyl-3-nitrobenzoic acid; 2-methyl-6-nitrobenzoic acid; 3-methyl-2-nitrobenzoic acid; 3-methyl-4-nitrobenzoic acid; 3-methyl-6-nitrobenzoic acid; 4-methyl-3-nitrobenzoic acid; anhydrides or salts thereof; and so forth.

If desired, a separator 92 may also be positioned adjacent to the anode 20 to inhibit direct contact between the anode and cathode, yet permit ionic current flow of the electrolyte to the electrodes. Examples of suitable materials for this purpose include, for instance, porous polymer materials (e.g., polypropylene, polyethylene, polycarbonate, etc.), porous inorganic materials (e.g., fiberglass mats, porous glass paper, etc.), ion exchange resin materials, etc. Particular examples include ionic perfluoronated sulfonic acid polymer membranes (e.g., Nafion™ from the E.I. DuPont de Nemeours & Co.), sulphonated fluorocarbon polymer membranes, polybenzimidazole (PBI) membranes, and polyether ether ketone (PEEK) membranes. To optimize the volumetric efficiency of the capacitor, it is generally desired that the separator 92 has a relatively small thickness. For example, the thickness of the separator 92, when employed, typically ranges from about 5 to about 250 micrometers, in some embodiments from about 10 to about 150 micrometers, and in some embodiments, from about 15 to about 100 micrometers.

Figure 2:
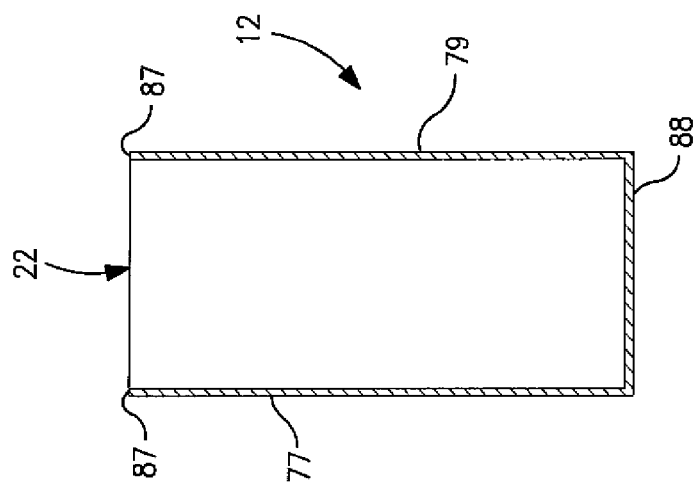
FIG. 2 is a cross-sectional view of one embodiment of a casing coated with an electrochemically active cathode material that may be used in the present invention.

Referring to FIGS. 2-3, the anode 20 and optional separator 92 may be positioned within an interior space 11 of a metal casing 12. The metal casing 12 is generally formed from a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. The metal casing 12 may have any desired shape, such as cylindrical, D-shaped, rectangular, triangular, prismatic, etc. In one embodiment, for example, the metal casing 12 may contain a generally cylindrical sidewall. Multiple sidewalls may also be used if desired. Typically, the casing 12 and anode 20 have the same or similar shape so that the anode 20 can be readily accommodated within the interior space 11. In the illustrated embodiment, for example, both the anode 20 and metal casing 12 have a generally cylindrical shape.

To achieve the desired volumetric efficiency, the difference between the anode width (e.g., diameter) and the width (e.g., diameter) of the interior space 11 defined by the metal casing 12 may be relatively small. For example, the anode 20 has a width that is defined between first and edge portions 7 and 9 and the interior space 11 has a width that is defined between interior surfaces of first and second edge portions 77 and 79, respectively. Typically, the ratio of the width of the anode to the width of the interior space ranges from about 0.80 to 1.00, in some embodiments from about 0.85 to about 0.99, in some embodiments from about 0.90 to about 0.99, and in some embodiments, from about 0.94 to about 0.98. The width of the anode 20 may, for example, range from about 0.5 to about 50 millimeters, in some embodiments from about 1 to about 40 millimeters, and in some embodiments, from about 4 to about 30 millimeters. Likewise, the width of the interior space 11 may range from about 0.5 to about 60 millimeters, in some embodiments from about 1 to about 50 millimeters, and in some embodiments, from about 4 to about 35 millimeters. The total diameter of the metal casing 12 may also vary, such as from about 1 to about 70 millimeters, in some embodiments from 2 to about 60 millimeters, and in some embodiments, from about 5 to about 50 millimeters.

Although not required, the length ratio is often slightly lower than the width ratio so that the metal casing can accommodate one or more optional liquid seals, which are discussed in more detail below. For example, the anode 20 has a length that is defined between opposing end portions 17 and 19 and the interior space 11 has a length that is defined between a lower end portion 88 and an upper edge 87 of the edge portions 77 and 79. Typically, the ratio of the length of the anode to the length of the interior space ranges from about 0.5 to 1.00, in some embodiments from about 0.6 to about 0.98, and in some embodiments, from about 0.65 to about 0.95. The length of the anode 20 may, for example, range from about 0.5 to about 100 millimeters, in some embodiments from about 1 to about 60 millimeters, and in some embodiments, from about 5 to about 30 millimeters. Likewise, the length of the interior space 11 may range from about 1 to about 200 millimeters, in some embodiments from about 5 to about 100 millimeters, and in some embodiments, from about 10 to about 50 millimeters.

If desired, an interior surface (e.g., sidewall and/or end) of the metal casing may be optionally roughened to increase surface area. Various techniques may be employed to accomplish such surface roughening, such as mechanical techniques (e.g., sandpaper, sandblasting, etc.); chemical etching; spark anodization, such as described in U.S. application Ser. No. 12/330,943 to Dreissig, et al. and Ser. No. 12/209,588 to Ning, et al.; and so forth. Regardless, an electrochemically-active cathode material (not shown) is also applied to at least a portion of an interior surface of the casing 12 to increase the effective surface area. For example, the cathode material may be disposed on an interior surface of the metal casing 12. One suitable cathode material is a conductive polymer, such as those that are π-conjugated and have electrical conductivity after oxidation or reduction (e.g., electrical conductivity of at least about 1 μS cm$^{-1}$ after oxidation). Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. Suitable polythiophenes may include, for instance, polythiophene and derivatives thereof, such as poly (3,4-ethylenedioxythiophene) ("PEDT"). In one particular embodiment, a polythiophene derivative is employed with recurring units of general formula (I) or formula (II) or recurring units of general formulae (I) and (II):

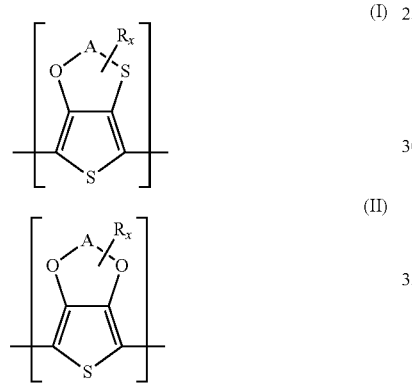

wherein,

A is an optionally substituted $C_1$ to $C_5$ alkylene radical (e.g., methylene, ethylene, n-propylene, n-butylene, n-pentylene, etc.);

R is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and x is an integer from 0 to 8, in some embodiments, from 0 to 2, and in some embodiments, x is 0. Example of substituents for the radicals "A" or "R" include, for instance, alkyl, cycloalkyl, aryl, aralkyl, alkoxy, halogen, ether, thioether, disulphide, sulfoxide, sulfone, suffonate, amino, aldehyde, keto, carboxylic acid ester, carboxylic acid, carbonate, carboxylate, cyano, alkylsilane and alkoxysilane groups, carboxylamide groups, and so forth.

The total number of recurring units of general formula (I) or formula (II) or of general formulae (I) and (II) is typically from 2 to 2,000, and in some embodiments, from 2 to 100.

Particularly suitable polythiophene derivatives are those in which "A" is an optionally substituted $C_2$ to $C_3$ alkylene radical and x is 0 or 1. In one particular embodiment, the polythiophene derivative is PEDT and has recurring units of formula (II), wherein "A" is $CH_2$—$CH_2$ and "x" is 0. Methods for forming such polythiophene derivatives are well known in the art and described, for instance, in U.S. Pat. No. 6,987,663 to Merker, et al., which is incorporated herein in its entirety by reference thereto for all purposes. For example, the polythiophene derivatives may be formed from a monomeric precursor, such as optionally substituted thiophenes. Particularly suitable monomeric precursors are substituted 3,4-alkylene-dioxythiophenes having the general formula (III), (IV) or a mixture of thiophene of general formulae (III) and (IV):

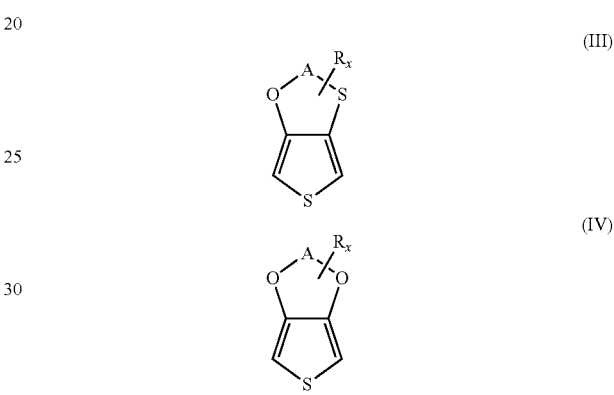

wherein, A, R, and X are as defined above.

Examples of such monomeric precursors include, for instance, optionally substituted 3,4-ethylenedioxythiophenes. Derivatives of these monomeric precursors may also be employed that are, for example, dimers or trimers of the above monomeric precursors. Higher molecular derivatives, i.e., tetramers, pentamers, etc. of the monomeric precursors are suitable for use in the present invention. The derivatives may be made up of identical or different monomer units and used in pure form and in a mixture with one another and/or with the monomeric precursors. Oxidized or reduced forms of these precursors may also be employed.

To produce the desired conductive polymer, monomeric precursors, such as described above, typically undergo oxidative polymerization in the presence of an oxidizing agent. The oxidizing agent may be a transition metal salt, such as a salt of an inorganic or organic acid that contain iron(III), copper(II), chromium(VI), cerium(IV), manganese(IV), manganese(VII), or ruthenium(III) cations. Particularly suitable transition metal salts include iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid);

iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sultanate, iron(III)-o-toluene sulfonate, and mixtures thereof, are particularly suitable for use in the present invention.

In some cases, the conductive polymer material may be in the form of a dispersion of particles having a relatively small size, such as an average diameter of from about 1 to about 500 nanometers, in some embodiments from about 5 to about 400 nanometers, and in some embodiments, from about 10 to about 300 nanometers. The $D_{90}$ value of the particles (particles having a diameter of less than or equal to the $D_{90}$ value constitute 90% of the total volume of all of the solid particles) may be about 15 micrometers or less, in some embodiments about 10 micrometers or less, and in some embodiments, from about 1 nanometer to about 8 micrometers. The diameter of the particles may be determined using known techniques, such as by ultracentrifuge, laser diffraction, etc.

The formation of the conductive polymers into a particulate form is typically enhanced by using a separate counterion to counteract a charged conductive polymer (e.g., polythiophene). That is, the conductive polymer (e.g., polythiophene or derivative thereof) used in the coating typically has a charge on the main polymer chain that is neutral or positive (cationic). Polythiophene derivatives, for instance, typically carry a positive charge in the main polymer chain. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to conductive polymers in a given layer of the coating is typically from about 0.5:1 to about 50:1, in some embodiments from about 1:1 to about 30:1, and in some embodiments, from about 2:1 to about 20:1. The weight of the electrically conductive polymers referred to above may refer to the weighed-in portion of the monomers used, assuming that a complete conversion occurs during polymerization.

In addition to or in lieu of conductive polymers, metals, such as metal particles formed from ruthenium, iridium, nickel, rhodium, rhenium, cobalt, tungsten, manganese, tantalum, niobium, molybdenum, lead, titanium, platinum, palladium, and osmium, as well as combinations of these metals, may also be employed as the electrochemically active cathode material. In one particular embodiment, for example, the electrochemically-active material includes palladium particles. Non-insulating oxide particles may also be employed in the present invention. Suitable oxides may include a metal selected from the group consisting of ruthenium, iridium, nickel, rhodium, rhenium, cobalt, tungsten, manganese, tantalum, niobium, molybdenum, lead, titanium, platinum, palladium, and osmium, as well as combinations of these metals. Particularly suitable metal oxides include ruthenium dioxide, niobium oxide, niobium dioxide, iridium oxide, and manganese dioxide. Carbonaceous particles may also be employed that have the desired level of conductivity, such as activated carbon, carbon black, graphite, etc. Some suitable forms of activated carbon and techniques for formation thereof are described in U.S. Pat. No. 5,726,118 to Ivey, et al.; U.S. Pat. No. 5,858,911 to Wellen, et al.; as well as U.S. Patent Application Publication No. 2003/0158342 to Shinozaki, et al., all of which are incorporated herein in their entirety by reference thereto for all purposes.

The cathode material may be applied to the casing 12 using a variety of known techniques, such as by dipping, spin coating, impregnation, pouring, dropwise application, injection, spraying, doctor blading, brushing or printing (e.g., ink-jet, screen, or pad printing). Although it may vary depending on the application technique employed, the viscosity of the cathode material is typically from about 0.1 to about 100,000 mPas (measured at a shear rate of 100 s$^{-1}$), in some embodiments from about 1 to about 10,000 mPas, in some embodiments from about 10 to about 1,500 mPas, and in some embodiments, from about 100 to about 1000 mPas. Once applied, the layer may be dried and washed. Drying may be performed at temperatures of from about −10° C. to about 250° C., and in some embodiments, from about 0° C. to about 200° C. The resulting dried coating may have a thickness of from about 0.2 micrometers ("μm") to about 100 μm, in some embodiments from about 1 μm to about 40 μm, and in some embodiments, from about 3 μm to about 10 μm. It should be understood that the thickness of the coating is not necessarily the same at all locations on the casing 12.

Figure 5:
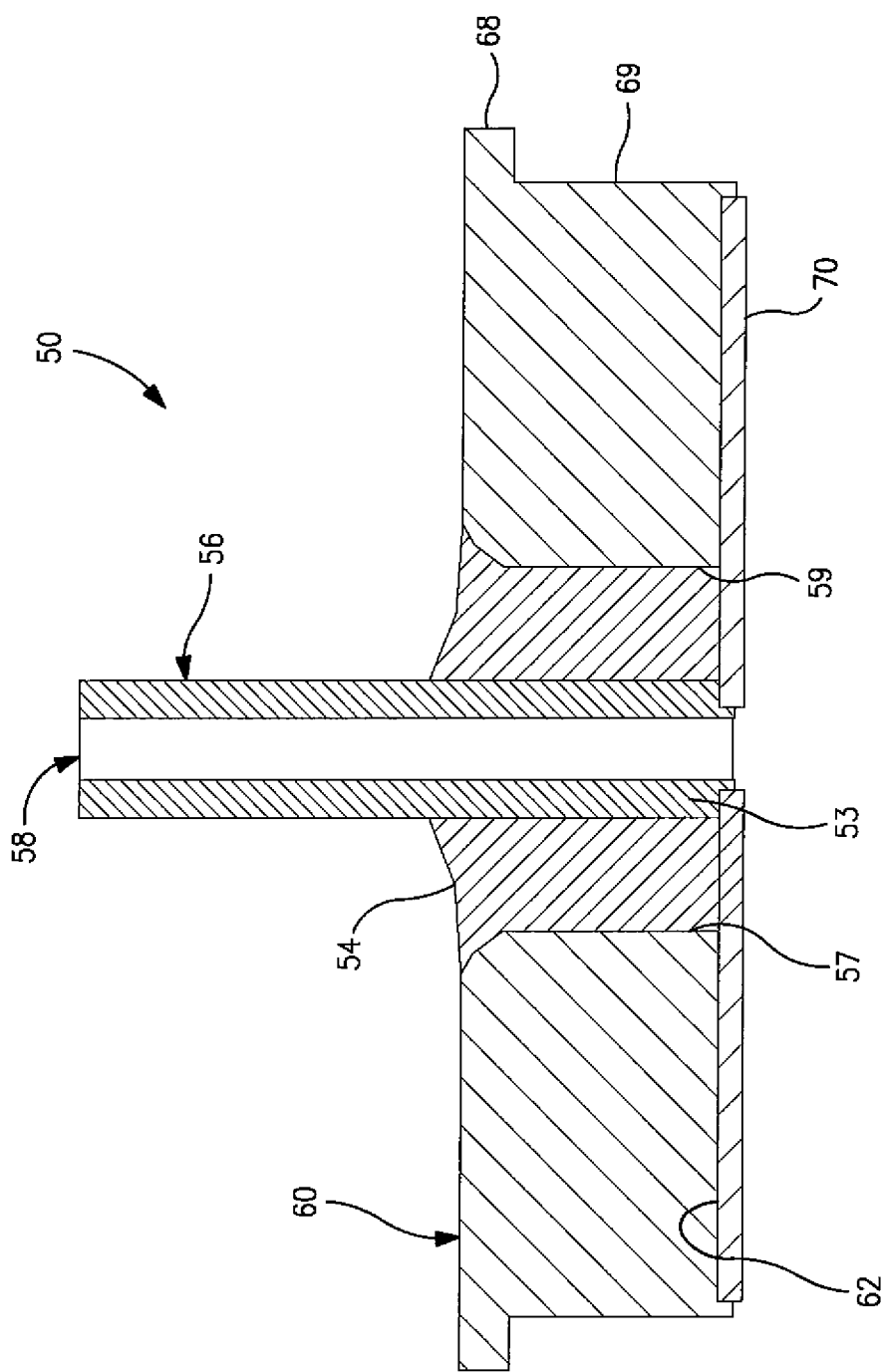
FIG. 5 is a cross-sectional view of one embodiment of a sealed lid assembly that may be used in the present invention.

To inhibit leakage of the electrolyte from the capacitor, a lid assembly is generally employed that is connected to the metal casing, such as by welding. The lid assembly may contain one or more hermetic seals, liquid seals, etc. Referring to FIG. 5, for example, one embodiment of a hermetically sealed lid assembly 50 is shown that contains a lid 52 having an upper planar surface 60 spaced from a lower planar surface 62. The lid 52 is typically formed from a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. Desirably, the casing 12 and the lid 52 are formed from the same materials, such as titanium metals or alloys thereof. In the illustrated embodiment, the lid 52 has a generally cylindrical cross-sectional shape. It should be understood, however, that any geometric configuration may be employed in the present invention, such as D-shaped, rectangular, triangular, prismatic, etc. Between the planar surfaces 60 and 62, the lid 52 has an outer diameter 68 forming a step 69 that leads to an inner diameter portion 69.

The lid 52 defines an internal orifice 59, which may be cylindrical and of a generally constant inside diameter. In the illustrated embodiment, the orifice 59 is defined by a cylindrical sidewall 57 spaced inwardly from the inner diameter portion 69. The sidewall 57 may be formed integral with the lid 52 or from a separate ferrule portion connected to the lid 52. Regardless, extending through the orifice 59 is a conductive tube 56 that is generally hollow and of a size and shape sufficient to accommodate an anode lead. The conductive tube 56 is typically formed from a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. An insulative material (e.g., glass) is also provided within the orifice 59 to form a hermetic seal 54 (e.g., glass-to-metal seal) between the conductive tube 56 and the sidewall 57.

The lid assembly 50 may also include a liquid seal 70 that is formed from a generally insulative sealant material. For example, the sealant material typically has an electrical resistance of about $1\times10^2$ ohms-m or more, in some embodiments about $1\times10^5$ Ohm·m or more, and in some embodiments, from about $1\times10^{15}$ to about $1\times10^{25}$ Ohm·m, determined at a temperature of 20° C. The liquid seal 70 covers at least a portion of the lower surface 62 of the lid 52 to limit its contact with any electrolyte that may leak from the casing. This removes the lid 52 from the circuit and helps improve leakage current. In this regard, the liquid seal 70 may sometimes cover a substantial portion of the lower surface 62 of the lid 52 and the lower surface of the hermetic seal 54. By "substantial portion", it is generally meant that the seal covers about 80% or more of the surface, in some embodiments about 90% or more of the surface, and in some embodiments, about 100% of the surface. As shown in FIG. 5, the liquid seal 70 also typically covers at least a portion of the conductive tube 56, such as a sidewall 53.

To help achieve the desired surface coverage, it is generally desired that the sealant material is flowable so that it can be heated during production of the capacitor and flow into small crevices. The temperature at which the material flows is generally above the operating temperature for which the part is rated so that the seal remains intact during operation. For example, the capacitor may sometimes be rated for operation at temperatures up to about 250° C. In such cases, the sealant material may become flowable at a temperature greater than about 250° C., in some embodiments from about 275° C. to about 350° C., and in some embodiments, from about 285° C. to about 325° C. By "flowable", it is generally understood that the material will have a viscosity of from about $10\times10^5$ to about $10\times10^7$ centipoise. Such flowable materials may be crystalline or semi-crystalline materials that melt or soften at the desired temperature (e.g., polymeric materials), or they may simply be amorphous materials that have a glass transition temperature low enough that the material can flow at the desired temperature. For example, glass materials may be employed, such as glass compositions containing CaO, $Al_2O_3$, $B_2O_3$, SrO, BaO, $LA_2O_3$, $SiO_2$, $TiO_2$, $Na_2O$, combinations thereof, etc. Barium lanthanboroate glass compositions, which contain boron oxide ($B_2O_3$), barium oxide (BaO), lanthanum oxide ($LA_2O_3$) and optionally at least one other oxide, are particularly suitable. Such compositions may be described in more detail in U.S. Pat. Nos. 5,648,302 and 5,104,738, which are incorporated herein in their entirety by reference thereto for all purposes.

Another example of a suitable crystalline or semi-crystalline sealant material for use in the liquid seal 70 is a fluoropolymer. The term fluoropolymer means a hydrocarbon backbone polymer in which some or all of the hydrogen atoms are substituted with fluorine atoms. The backbone polymer is usually polyolefinic and formed from fluorine-substituted, unsaturated olefin monomers. The fluoropolymer can be a homopolymer of such fluorine-substituted monomers or a copolymer of fluorine-substituted monomers or mixtures of fluorine-substituted monomers and non-fluorine-substituted monomers. Along with fluorine atoms, the fluoropolymer can also be substituted with other halogen atoms, such as chlorine and bromine atoms. Representative monomers suitable for forming fluoropolymers for use in this invention are tetrafluoroethylene ("TFE"), vinylidene fluoride ("VF2"), hexafluoropropylene ("HFP"), chlorotrifluoroethylene ("CTFE"), perfluoroethylvinyl ether ("PEVE"), perfluoromethylvinyl ether ("PMVE"), perfluoropropylvinyl ether ("PPVE"), etc., as well as mixtures thereof. Specific examples of suitable fluoropolymers include polytetrafluoroethylene ("PTFE"), perfluoroalkylvinyl ether ("PVE"), poly(tetrafluoroethylene-co-perfluoroalkyvinyl ether) ("PFA"), fluorinated ethylene-propylene copolymer ("FEP"), ethylene-tetrafluoroethylene copolymer ("ETFE"), polyvinylidene fluoride ("PVDF"), polychlorotrifluoroethylene ("PCTFE"), and TFE copolymers with VF2 and/or HFP, etc., as well as mixtures thereof. A particularly suitable fluoropolymer is poly(tetrafluoroethylene-co-perfluoroalkyvinyl ether) ("PFA").

If desired, the liquid seal 70 may be in the form of a laminate that contains layers of different flow properties. For example, the liquid seal 70 may contain a sealant layer that becomes readily flowable at the temperatures indicated above and a generally rigid layer that is not flowable or is flowable only at temperatures higher than the sealant layer. The generally rigid layer may, for instance, become flowable at a temperature that is 5° C. or more, in some embodiments, about 10° C. or more, and in some embodiments, about 20° C. or more than the temperature at which the sealant layer becomes flowable. In one embodiment, for instance, the sealant layer is formed from poly(tetrafluoroethylene-co-perfluoroalkyvinyl ether) ("PFA"), which generally has a melting point of about 305° C., and the generally rigid layer is formed from poly(tetrafluoroethylene) ("PTFE"), which generally has a melting point of about 327° C. Among other things, the generally rigid layer can reduce the likelihood that the sealant layer will flow into undesired areas of the capacitor when heated will flow into undesired areas of the capacitor when heated, and maintain the surface coverage of the lid's inner surface.

For example, the sealant material 70 may be a laminate containing two layers (e.g., sealant layer/rigid layer) in which the sealant layer is positioned directly adjacent to the lid 52. In this manner, the sealant layer is able readily flow and coat the lower surfaces of the lid and the hermetic seal, but the rigid layer can limit its ability to pass into the casing. In other embodiments, the sealant material 70 may be a laminate containing three layers (e.g., sealant layer/rigid layer/sealant layer) in which sealant layers are positioned adjacent to the lid 52 and the anode. Among other things, this allows the sealant material 70 to be readily applied to the lid 52 and/or the anode during manufacture of the capacitor.

In addition to the liquid seal 70 discussed above, the capacitor of the present invention may also contain one or more secondary liquid seals. Referring again to FIG. 4, for example, a gasket 89 is shown that is located adjacent to an upper end portion 17 of the anode 20. The gasket 89 generally has a cylindrical shape and contains a bore coaxially located therein through which the anode lead 42 can extend. The gasket 89 may be formed from any of a variety of insulative materials, such as described above (e.g., PTFE). Elastomeric rings 94 may also be employed as an additional liquid seal. If desired, the rings 94 may be positioned adjacent to the edge portions 77 and 79 of the casing 12 and thereby and help inhibit leakage of the electrolyte therethrough. The elastomeric rings 94 may be formed from an elastomer that is resistant to corrosion by the electrolyte and has sufficient dielectric strength to withstand the maximum voltage generated by the capacitor. In one embodiment, the elastomer can perform over a temperature range of about −55° C. to about 200° C. without degradation or loss of elasticity. Examples of elastomers that may be employed include butyl rubber, chlorobutyl rubber, ethylene propylene rubber (EPR), ethylene propylene diene rubber (EPDM), fluoroelastomers, such as VITON™, polytetrafluoroethylene, polychloroprene rubber, butadiene rubber, nitrile rubber, isoprene rubber, silicone rubber and styrene butadiene rubber.

Figure 6:
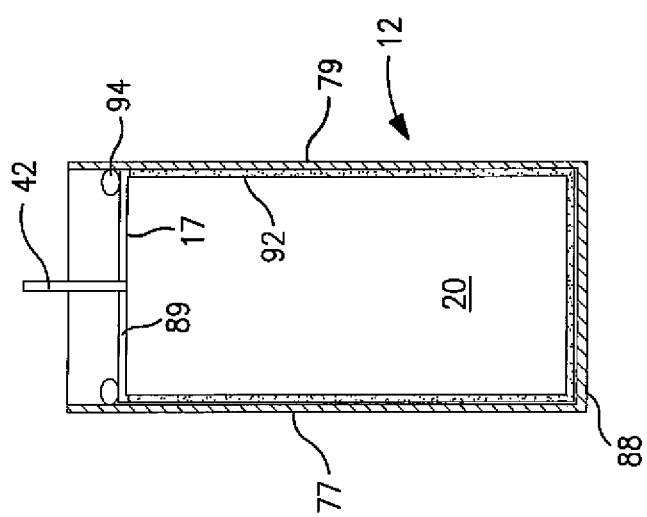
FIG. 6 shows the lid assembly of FIG. 5 positioned over the casing of FIG. 4.

One embodiment for attaching the lid assembly 50 to the casing 12 is shown in FIG. 6. As illustrated, the lid assembly 50 is positioned such that the liquid seal 70 is adjacent to the elastomeric rings 94. Once in the desired position, pressure may be applied to the assembly 50 to compress the elastomeric rings 94 and create a secondary liquid seal. By way of example, the elastomeric rings may be compressed to about 30% to about 85% of their original thickness. Thereafter, the lid 52 is welded to the casing 12. Referring to FIG. 7, the anode lead 42 extends through the conductive tube 56 and is sealed thereto at the outer end by a weld joint 104. An external positive lead 100, preferably of nickel, may likewise be welded at the weld joint 104. Similarly, an external negative lead 102 may be welded to the bottom of the casing 12.

The resulting capacitor of the present invention may exhibit excellent electrical properties. For example, the capacitor may exhibit a high energy density that enables it suitable for use in high pulse applications. Energy density is generally determined according to the equation $E=\frac{1}{2}*CV^2$, where C is the capacitance in farads (F) and V is the working voltage of capacitor in volts (V). The capacitance may, for instance, be measured using a capacitance meter (e.g., Keithley 3330 Precision LCZ meter with Kelvin Leads, 2 volts bias and 1 volt signal) at operating frequencies of from 10 to 120 Hz and a temperature of 25° C. For example, the capacitor may exhibit an energy density of about 2.0 joules per cubic centimeter ($J/cm^3$) or more, in some embodiments about 3.0 $J/cm^3$, in some embodiments from about 4.0 $J/cm^3$ to about 10.0 $J/cm^3$, and in some embodiments, from about 4.5 to about 8.0 $J/cm^3$. The capacitance may likewise be about 1 milliFarad per square centimeter ("$mF/cm^2$") or more, in some embodiments about 2 $mF/cm^2$ or more, in some embodiments from about 5 to about 50 $mF/cm^2$, and in some embodiments from about 8 to about 20 $mF/cm^2$.

The equivalent series resistance ("ESR")—the extent that the capacitor acts like a resistor when charging and discharging in an electronic circuit—may also be less than about 15,000 milliohms, in some embodiments less than about 10,000 milliohms, in some embodiments less than about 5,000 milliohms, and in some embodiments, from about 1 to about 1,000 milliohms, measured with a 2-volt bias and 1-volt signal at a frequency of 1000 Hz. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 1 $\mu A/\mu F*V$, in some embodiments less than about 0.5 $\mu A/\mu F*V$, and in some embodiments, less than about 0.1 $\mu A/\mu F*V$, where $\mu A$ is microamps and $\mu F*V$ is the product of the capacitance and the rated voltage. Leakage current may be measured using a leakage test meter (e.g., MC 190 Leakage test, Mantracourt Electronics LTD, UK) at a temperature of 25° C. and at a certain rated voltage after a charging time of from about 60 to about 300 seconds. Such ESR and normalized leakage current values may even be maintained after aging for a substantial amount of time at high temperatures. For example, the values may be maintained for about 100 hours or more, in some embodiments from about 300 hours to about 2500 hours, and in some embodiments, from about 400 hours to about 1500 hours (e.g., 500 hours, 600 hours, 700 hours, 800 hours, 900 hours, 1000 hours, 1100 hours, or 1200 hours) at temperatures ranging from about 100° C. to about 250° C., and, in some embodiments from about 100° C. to about 200° C. (e.g., 100° C., 125° C., 150° C., 175° C., or 200° C.).

The electrolytic capacitor of the present invention may be used in various applications, including but not limited to medical devices, such as implantable defibrillators, pacemakers, cardioverters, neural stimulators, drug administering devices, etc.; automotive applications; military applications, such as RADAR systems; consumer electronics, such as radios, televisions, etc.; and so forth. In one embodiment, for example, the capacitor may be employed in an implantable medical device configured to provide a therapeutic high voltage (e.g., between approximately 500 Volts and approximately 850 Volts, or, desirably, between approximately 600 Volts and approximately 900 Volts) treatment for a patient. The device may contain a container or housing that is hermetically sealed and biologically inert. One or more leads are electrically coupled between the device and the patient's heart via a vein, Cardiac electrodes are provided to sense cardiac activity and/or provide a voltage to the heart. At least a portion of the leads (e.g., an end portion of the leads) may be provided adjacent or in contact with one or more of a ventricle and an atrium of the heart. The device also contains a capacitor bank that typically contains two or more capacitors connected in series and coupled to a battery that is internal or external to the device and supplies energy to the capacitor bank, Due in part to high conductivity, the capacitor of the present invention can achieve excellent electrical properties and thus be suitable for use in the capacitor bank of the implantable medical device.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A wet electrolytic capacitor comprising:
a metal casing that contains a first edge portion and an opposing second edge portion extending in a longitudinal direction from an end portion to define an interior space;
an electrochemically active cathode material disposed on at least a portion of an interior surface of the metal casing;
an anode formed from an anodically oxidized, sintered porous body, the anode containing an upper end portion and a lower end portion, wherein a first edge portion and an opposing second edge portion of the anode extend in the longitudinal direction between the upper end portion and the lower end portion to define a length of the anode, wherein a medial longitudinal plane extends through the upper end portion of the anode in a direction parallel to the longitudinal direction, wherein the distance between the medial longitudinal plane and the respective edge portions of the anode is generally constant along the length of the anode, the anode further having a width defined between the first edge portion and the second edge portion, wherein the ratio of the width of the anode to the width of the interior space is from about 0.80 to 1.00, further wherein the anode is positioned within and occupies about 70 vol. % or more of the interior space defined by the metal casing, and
a liquid electrolyte that is in electrical contact with the anode and the electrochemically active material.

2. The wet electrolytic capacitor of claim 1, wherein the anode occupies from about 80 vol. % to about 98 vol. % of the interior space.

3. The wet electrolytic capacitor of claim 1, wherein the difference between the distance between the medial plane and the first edge portion of the anode and the distance between the medial plane and the second portion of the anode is about 0.20 millimeters or less along the length of the anode.

4. The wet electrolytic capacitor of claim 1, wherein the anode has a radius of curvature of about 25 centimeters or greater in the direction of a medial transverse plane that is perpendicular to the medial longitudinal plane.

5. The wet electrolytic capacitor of claim 1, the ratio of the length of the anode to the length of the interior space is from about 0.70 to about 1.00.

6. The wet electrolytic capacitor of claim 1, wherein the length of the anode is from about 1 to about 60 millimeters.

7. The wet electrolytic capacitor of claim 1, wherein the ratio of the width of the anode to the width of the interior space is from about 0.90 to about 0.99.

8. The wet electrolytic capacitor of claim 1, wherein the width of the anode is from about 1 to about 40 millimeters.

9. The wet electrolytic capacitor of claim 1, further comprising a separator that surrounds at least a portion of the first edge portion of the anode, the second edge portion of the anode, the upper end portion of the anode, the lower end portion of the anode, or a combination thereof.

10. The wet electrolytic capacitor of claim 1, further comprising a lead that extends in the longitudinal direction from the porous body of the anode.

11. The wet electrolytic capacitor of claim 1, wherein the electrochemically active cathode material includes a conductive polymer.

12. The wet electrolytic capacitor of claim 11, wherein the conductive polymer is poly(3,4-ethylenedioxythiophene).

13. The wet electrolytic capacitor of claim 1, wherein the porous body includes tantalum, niobium, or an electrically conductive oxide thereof.

14. The wet electrolytic capacitor of claim 1, wherein the liquid electrolyte is aqueous.

15. The wet electrolytic capacitor of claim 1, wherein the metal casing and the anode have a generally cylindrical shape.

16. The wet electrolytic capacitor of claim 1, wherein the metal casing is formed from titanium, tantalum, or a combination thereof.

17. The wet electrolytic capacitor of claim 1, wherein the metal casing defines an opening at an end opposite to the end portion of the metal casing, the capacitor further comprising a lid sealing the opening.

* * * * *